United States Patent
Hochwarth et al.

(10) Patent No.: US 12,139,250 B2
(45) Date of Patent: Nov. 12, 2024

(54) METHOD AND SYSTEM TO PROVIDE DATA FROM AN AVIONICS SYSTEM

(71) Applicant: GE AVIATION SYSTEMS LLC, Grand Rapids, MI (US)

(72) Inventors: Joachim Karl Ulf Hochwarth, Caledonia, MI (US); Víctor Mario Leal Herrera, Querétaro (MX)

(73) Assignee: GE Aviation Systems LLC, Grand Rapids, MI (US)

( * ) Notice: Subject to any disclaimer, the term of this patent is extended or adjusted under 35 U.S.C. 154(b) by 448 days.

(21) Appl. No.: 17/680,966

(22) Filed: Feb. 25, 2022

(65) Prior Publication Data

US 2023/0271698 A1    Aug. 31, 2023

(51) Int. Cl.
*G06F 15/16* (2006.01)
*B64C 19/00* (2006.01)
*H04L 67/12* (2022.01)

(52) U.S. Cl.
CPC ............ *B64C 19/00* (2013.01); *H04L 67/12* (2013.01)

(58) Field of Classification Search
None
See application file for complete search history.

(56) References Cited

U.S. PATENT DOCUMENTS

| | | |
|---|---|---|
| 7,769,501 B2 | 8/2010 | Lusardi et al. |
| 7,840,770 B2 | 11/2010 | Larson et al. |
| 7,970,410 B2 | 6/2011 | Brinkley et al. |
| 8,229,791 B2 | 7/2012 | Bradley et al. |
| 8,335,609 B2 | 12/2012 | Beacham et al. |
| 9,922,108 B1* | 3/2018 | Meiklejohn ........... G06F 16/289 |
| 10,334,081 B2 | 6/2019 | Liu et al. |
| 10,417,261 B2 | 9/2019 | Hochwarth et al. |
| 10,991,255 B2 | 4/2021 | Hochwarth et al. |
| 11,102,302 B2 | 8/2021 | Watson et al. |
| 11,381,664 B1* | 7/2022 | Luker .................... H04L 67/55 |
| 11,647,854 B1* | 5/2023 | Mehnert ................. G01F 22/00 |
| | | 220/703 |
| 2015/0332490 A1* | 11/2015 | Coulmeau .............. B64D 43/00 |
| | | 701/3 |
| 2016/0044077 A1* | 2/2016 | Tripathy ............... G06F 16/188 |
| | | 709/213 |
| 2017/0242910 A1 | 8/2017 | Hochwarth et al. |

(Continued)

*Primary Examiner* — Phuoc H Nguyen
(74) *Attorney, Agent, or Firm* — McGarry Bair PC

(57) ABSTRACT

An avionics system can provide data to a first receiving component associated with a proprietary first protocol and a second receiving component associated with a non-proprietary second protocol. A configuration tool generates a first configuration file comprising instructions for a data access component to provide a first data output to the first receiving component, and a second data output to the second receiving component. The configuration tool can generate a second configuration file including instructions to convert the second data output. The data access component can receive a definition database defining the first protocol to convert the data according to the non-proprietary second protocol. The data access component can provide the requested data to the first and second receiving components in accordance with the non-proprietary second protocol. The second receiving component is configured convert the data received based on the second configuration file.

20 Claims, 4 Drawing Sheets

(56) References Cited

U.S. PATENT DOCUMENTS

2019/0223007 A1* 7/2019 Weaver ............... H04W 12/088
2019/0332227 A1 10/2019 Sivaratri et al.
2020/0410871 A1 12/2020 Williams et al.
2021/0130005 A1 5/2021 Leal Herrera et al.
2021/0319706 A1 10/2021 Toews

* cited by examiner

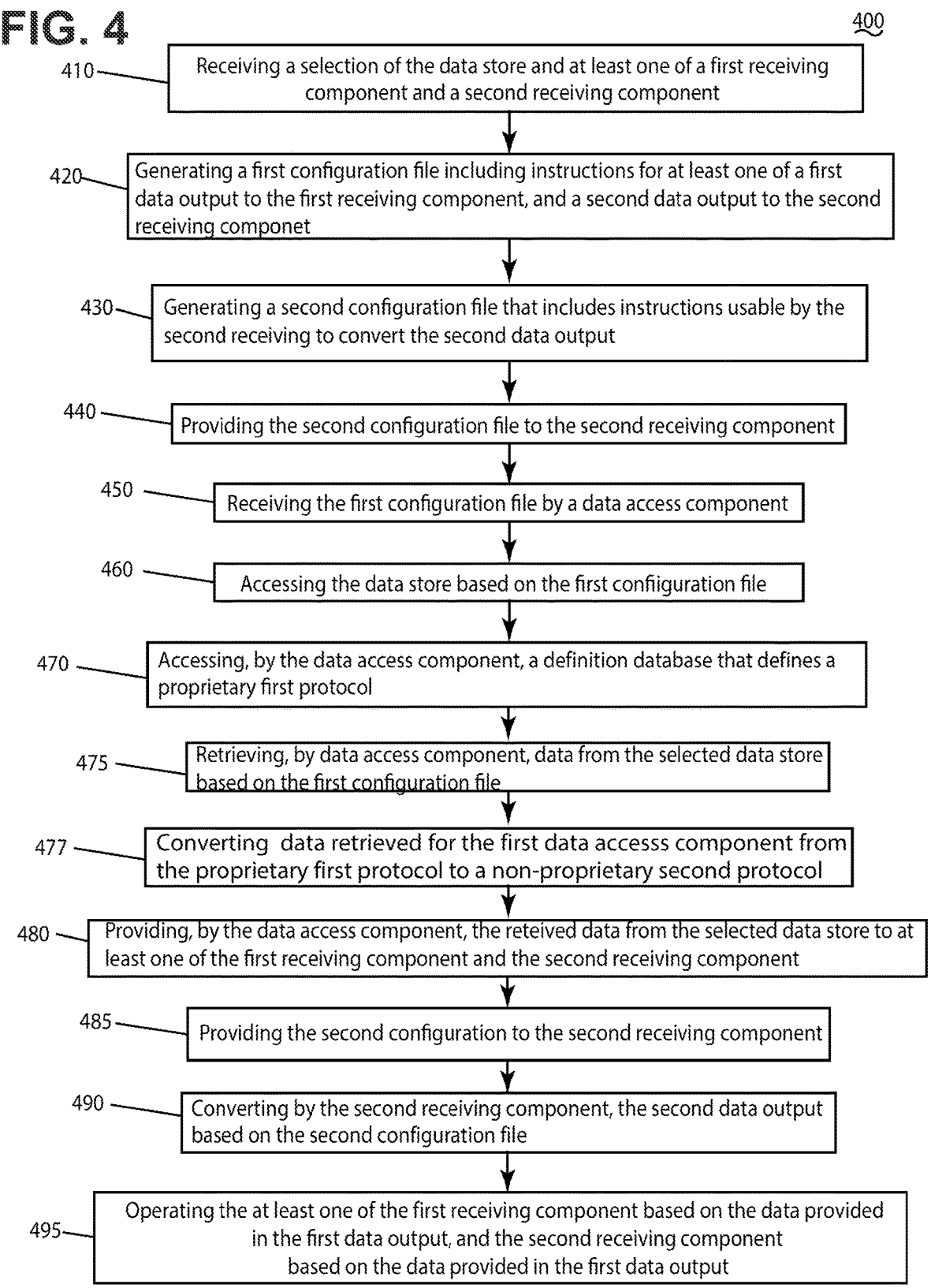

METHOD AND SYSTEM TO PROVIDE DATA FROM AN AVIONICS SYSTEM

BACKGROUND

Modern aircraft employ complex Flight Management Systems (FMSs) that handle and control large amounts of important data for the aircraft. Presently, in order to access internal data from a conventional FMS, an access interface must be defined at compile time in the software. However, due to certification requirements and safety concerns, changing or altering this access interface, or adding a new access interface, necessitates additional testing and recertification. As a result of the additional testing and recertification requirements, the access interface can be difficult and costly to change. Often, these interfaces will have undergone many changes throughout the course of a development program, but are too costly to change once the system is in service.

BRIEF DESCRIPTION OF THE DRAWINGS

In the drawings:

FIG. 4 depicts a flow diagram of a method of providing data from an avionics system, in accordance with various aspects described herein.

DETAILED DESCRIPTION

Figure 1:
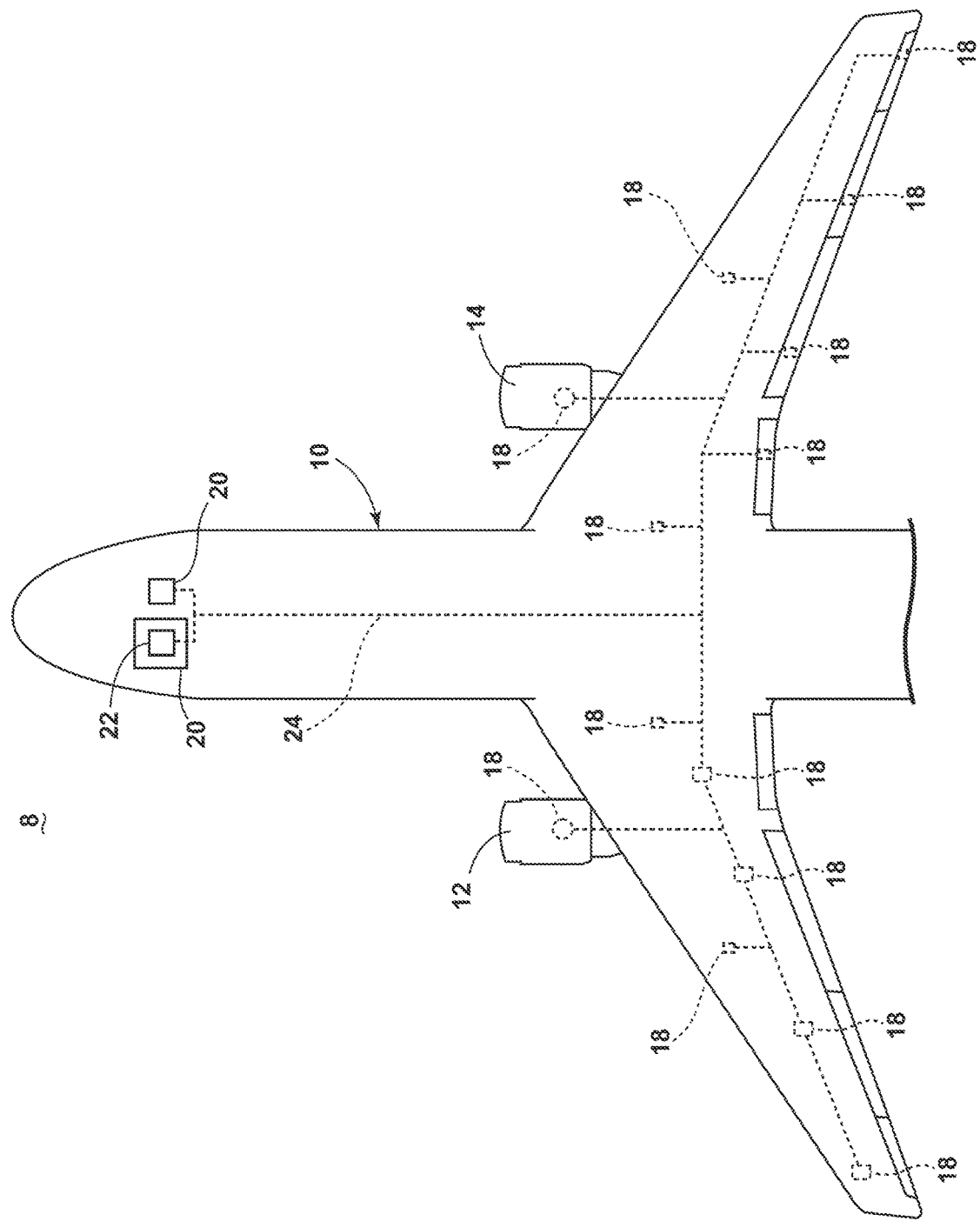
FIG. 1 depicts a top down schematic view of an example aircraft, in accordance with various aspects described herein.

Aspects of the disclosure can be implemented in any environment, apparatus, or method for providing data from an avionics device regardless of the specific function performed by the avionics device.

As used herein, the term "set" or a "set" of elements can be any non-zero number of elements, including only one. The exemplary drawings are for purposes of illustration only and the dimensions, positions, order and relative sizes reflected in the drawings attached hereto can vary.

Additionally, as used herein, a "processor", or "controller module" can include a component configured or adapted to provide instruction, control, operation, or any form of communication for operable components to affect the operation thereof. A processor or controller module can include any known processor, microcontroller, or logic device, including, but not limited to: Field Programmable Gate Arrays (FPGA), an Application Specific Integrated circuit (ASIC), a Full Authority Digital Engine Control (FADEC), a Proportional controller (P), a Proportional Integral controller (PI), a Proportional Derivative controller (PD), a Proportional Integral Derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a processor or controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" or "retrieving" data can refer to either reading, viewing, or otherwise receiving data from a data store, or a combination thereof. As used herein, a "regulated" system is a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write-access to a specific data element.

Transfer of data from the FMS to an access interface can utilize specialized data networks, such as Aeronautical Radio Inc. (ARINC) compliant data networks, and can define open source or non-proprietary standards or specifications for network operations, including data storage and data transmissions. However, some avionics platforms and access interface devices can further utilize different specialized or proprietary data formats, and protocols defined for example, by the device manufacturer.

Aspects of the disclosure described herein are provided with respect to a specialized avionics data protocol, but it will be understood that the aspects described herein can be implemented in any environment using a data communications network interconnecting an avionics system with one or more data-receiving components or avionics systems, or the like. Aspects of the disclosure can include avionics systems configured to operate according to defined system characteristics or specifications. For example, contemporary aircraft operate a set of components interconnected by way of a data network defined by a network standard, such as the ARINC-based standards, for example ARINC 429 (A429) specification, ARINC 664 (A664), Ethernet, or the like, which are incorporated herein in their entirety. Furthermore, while the aforementioned examples can include network topology examples, application level protocol standards, including but not limited to, ARINC 702A (A702A), ARINC 834 (A834), or the like, can be included in their entirety.

Example aspects of the present disclosure are directed to systems and methods that enable flexibly providing internal data of an avionics system (e.g., a FMS, an Airport Surface Map System (ASMS), etc.) to an avionics device or application. In particular, an interface such as an avionics device is typically required to access internal data from an FMS. As used herein, the term "avionics device" is not intended to be limiting and can be any desired avionics device that requires access to data from an avionics system (e.g., a FMS, an ASMS, etc.), without departing from the scope of the disclosure herein. In this sense, the avionics device requiring data from an avionics system can be defined as a data receiving component. In various non-limiting aspects, for example, the avionics device or data receiving component can include without limitation, one or more of an electronic flight bag (EFB), a flight data recorder (FDR), Automatic Dependent Surveillance-Broadcast system (ADS-B), Aircraft Interface Device (AID), a communications management unit (CMU), an in-flight entertainment system (IES), or an on-board maintenance system. Other aspects are not so limited however, and as used herein, the term "data receiving component" can refer to any avionics device that requires operative access to data from an avionics system (e.g., a FMS). It will be appreciated that in some cases, a particular data receiving component can be configured to operate based in part on receiving data in accordance with a proprietary protocol (e.g., a serial byte stream) associated with the particular receiving component. For example, many avionics devices are manufactured and configured to operate based on protocols developed or licensed by the device manufacturer. Such protocols can be proprietary to the manufacturer, and thus may not be open-source or otherwise readily accessible by others not licensed by the manufacturer. Due to certification requirements and safety concerns, adding an avionics device or data receiving component employing a proprietary network communications protocol to an existing avionics system, can necessitate additional testing and recertification. For example, additional testing and recertification can be required to validate that the data receiving component can reliably convert a standard data stream provided by the FMS in accordance with a particular non-proprietary protocol (e.g., an ARINC 664 protocol) usable by the second access interface. As a result of such additional testing and recertification requirements, interface devices, applications, and software can be difficult and costly to add or modify. Accordingly, one advantage of the disclosed subject matter is to provide a method and system that enables flexible access and configuration of internal data of an avionics system (e.g., an FMS) to provide the data from the avionics system in accordance with a selectable protocol, without requiring a conversion or decoding of the data by the data receiving component or requiring recertification when changing or modifying data receiving component.

For example, a particular aircraft can be operated via an avionics system including an on-board FMS communicatively coupled over an aviation data network with a set of avionics devices (data receiving components) such as an EFB. The EFB can be configured to host applications such as purpose-built software applications to automate functions normally conducted by hand, such as take-off performance calculations. The EFB can be configured to communicate with the FMS over the data network in compliance with a non-proprietary communication protocol such as ARINC 334. The data network can be configured to operate in accordance with a non-proprietary network standard, such as ARINC 664. The avionics system and its components typically require testing and/or certification prior to implementation to ensure airworthiness or compliance with operating regulations, to obtain authorization for use by aviation authorities.

It is sometimes desirable to replace or upgrade one or more of the existing avionics devices (e.g., the EFB) in a legacy avionics system. For example, it may be desirable to add a new application to the EFB to provide added functionality. In some cases, however, the new EFB or application may be configured to operate (e.g., read or write data) in accordance with a non-standard or proprietary protocol. In some cases, the FMS can be configured to subscribe to the new proprietary data sets which can be stored in memory. Typically, however, the FMS will have practical limits on the available internal memory required for this approach, making it costlier and more impractical to implement the new device or application. Additionally, in such cases, i.e., where data structured in accordance with a proprietary protocol may be communicated on the legacy non-proprietary data network, existing aviation regulations often require additional testing and/or certification of the avionics system and/or the EFB. As will described in more detail herein, aspects of the disclosure enable flexible access and configuration of data in the FMS to provide the data from the FMS to the EFB in the legacy data network in accordance with the standard non-proprietary protocol. For example, the new EFB can provide a definitions database accessible by the FMS. The definition database can define the proprietary protocol associated with the new EFB and specify predetermined information for data storage or transmission, (e.g. data offsets, sizes, types, parameters, etc.). In the event of a request or selection of data to be sent from the FMS to the new EFB, a loadable configuration file can be generated by a configuration tool, based in part on the definition database, and provided to the new EFB. The configuration file can also include instructions for the FMS to convert the data from the proprietary protocol to the non-proprietary protocol, and to output the data to the new EFB, in compliance with the non-proprietary protocol on the data network. In this way, the new EFB or application that would otherwise be incompatible with the non-proprietary communication protocols of the legacy aviation system can be implemented without re-certifying the avionics system.

Aspects of the present disclosure provide a technique to select, customize, or otherwise flexibly define data that is output or provided by the avionics system during runtime and provide the data to at least one of a selected first interface or second interface, in accordance with a respective predetermined first protocol or second protocol, corresponding to the selected receiving component. For example, in non-limiting aspects, a data access component of the avionics system can be provided with a definition database defining a predetermined first protocol for storing or transmitting data associated with a particular first data receiving component. For example, the predetermined first protocol can be a proprietary protocol associated with the first receiving component. Additionally, or alternatively, in non-limiting aspects, systems of the present disclosure can include a configuration tool that can define a second protocol for storing or transmitting data associated with a particular second interface or receiving component. For example, the second protocol can be a standard or non-proprietary protocol (e.g., an ARINC-based protocol). The configuration tool can further enable a system operator to make selections (e.g., via a user interface) of which data is desired to be thereafter output, and to select at least one of the receiving components to receive the data. The selected data can be output to the selected receiving component in accordance with the corresponding second protocol.

As one non-limiting example, in some implementations, the application source code of the avionics system can be parsed to create a parsed available data file that lists data stores available for subscription or access. The parsed available data file can further include information about one or more parameters associated with the data stores, size of the data stores, one or more offsets associated with the data stores, endianness of the data stores, byte alignment, or other information regarding the available data and the anticipated storage structure. For example, the parsed available data file can further include information indicative of the first protocol or the second protocol, or both. In other non-limiting aspects, the parsed available data file can include any desired information about any desired parameter associated with the data stores, without departing from the scope of the disclosure herein. In some non-limiting aspects, the data stores can comprise a set of data Topics or Mailslots.

In non-limiting aspects, the configuration tool can use the parsed available data file to provide an interactive graphical user interface that allows the user to select data in a set of data stores to be output by or otherwise retrieved from the avionics system. The user interface can also enable the user to select various preferences for other data settings or parameters. For example, the user interface can enable the user to select, without limitation, an output frequency for each data store, selected parameters for each data store, groups and sub-groups of data or data parameters, etc., and combinations thereof.

Based at least in part on such user selections, the configuration tool can generate a loadable first configuration file that instructs or otherwise informs the data access component of the avionics system regarding the identity of the data or data stores selected by the user. Further, in some non-limiting aspects, in addition to identifying the data or data stores selected by the user, the loadable first configuration can include additional information for each identified data store, such as, for example, offsets, size, parameters, etc. In non-limiting aspects, the configuration tool can additionally, or alternatively, generate the loadable first configuration file based in part on the definition database defining the first protocol. In some implementations, the loadable first configuration file can specify certain data groups that can be toggled during runtime of the avionics system.

In non-limiting aspects, in addition to the user selections, the configuration tool can generate the loadable first configuration file based at least in part on other information such as, without limitation, the first protocol, the second protocol, a structure of data in one or more data stores of the avionics system, platform information, processor information, and/or one or more requirements associated with a receiving component that receives the selected data output by the avionics system.

In addition, the configuration tool can also generate a second configuration file that can be used to convert certain data output by the data access component, as will be discussed further below. In some non-limiting aspects, the configuration tool can generate the first configuration file or second configuration file, or both based on information received from an Electronic Flight Bag (EFB). In some other non-limiting aspects, the configuration tool can generate the first configuration file or second configuration file, or both based on information received from the data receiving components themselves.

The data access component can subscribe to data in the data stores (e.g., particular data topics) based on the loadable first configuration file. In particular, the data access component can output data from the subscribed data stores during runtime of the avionics system. In some aspects, the data access component can output data as a stream output to one or more receiving components that can be configured to receive the stream output data. The one or more receiving components can receive the stream output data and convert the stream output data based at least in part on the second configuration file received from the configuration tool. Additionally, or alternatively, the data access component can output data as a stream output to one or more receiving components without need to convert the non-stream output by the respective one or more receiving components.

Each receiving component can be any device, program, application, or other system component for which the system operator desires to provide selected data from the avionics system. As examples, the receiving component can be a simulation system, a data recorder (e.g., a "black box"), an onboard maintenance system, an in-flight air-to-ground data transmission system, or any other device, system, or component for which receipt of particular user-selected avionics data is desired, including components internal to the avionics system.

By way of a providing a clearer understanding of an operation of various non-limiting aspects, an example thereof will be provided. It will be appreciated that the non-limiting example provided is only one such possible instance of many non-limiting aspects as disclosed herein, and other aspects are not so limited.

For example, a particular aircraft can include an FMS communicatively coupled to an EFB over a data network. The data network can be configured to operate in accordance with a non-proprietary network standard, such as ARINC 664. The EFB can include a device such as an Auxiliary Performance Computer (APC). The EFB can also host a suite of software applications and databases providing known functionality and services. For example, the EFB can host a particular software application providing navigational chart information to the operator (e.g. a pilot) in the cockpit of the aircraft. The EFB, and its software applications, can be configured to operate in accordance with a non-proprietary communication protocol such as ARINC 334. Prior to an initial operation of the aircraft, the aircraft and its components (i.e., including at least the FMS and EFB) require testing and certification to demonstrate compliance with operating and airworthiness regulations established by aviation authorities. For example, in certain cases, such as when the operator's sole source of navigational chart information is contained in the EFB, the operator must demonstrate the EFB will continue to operate properly throughout a decompression event, and thereafter, regardless of altitude. In this particular example, the EFB can include a legacy software application operating in accordance with a non-proprietary communication protocol to provide navigational chart information to the operator in the cockpit. In the event that it is subsequently desired to upgrade the EFB to host a new or more advanced version of the navigational software, but one that operates in accordance with a proprietary communication protocol, the FMS and EFB with the upgraded navigational application would be required to "re-certify" compliance with aviation regulations prior to implementation, due to the possible incompatibility of the new proprietary protocol used by the new EFB application, with the legacy non-proprietary protocol of the data network.

However, in this non-limiting example, a data access component of the FMS can be provided with a definition database defining the proprietary protocol for storing or transmitting data associated with the EFB application. For example, the definition database can be uploaded to the FMS by the operator. In other non-limiting aspects, the definition database can be provided by the EFB to the FMS.

Regardless of how the definition database is provided to the FMS, the FMS can also include a configuration tool to define the non-proprietary protocol used by other avionics devices or applications on the data network for storing or transmitting data (e.g., an ARINC-based protocol). The configuration tool can also enable the operator to select (e.g., via a user interface) particular data to be output from the FMS, and to select one or more avionics devices to receive the data (e.g., such as the EFB). The selected data can be output to the selected devices, including the EFB, in accordance with the corresponding non-proprietary protocol.

For example, the application source code of the FMS can be parsed to create a parsed available data file that lists data stores available for subscription or access. The parsed available data file can include information about predetermined parameters associated with the data stores, size of the data stores, one or more offsets associated with the data stores, endianness of the data stores, byte alignment, or other information regarding the available data and the anticipated storage structure. The parsed available data file can further include information indicative of the proprietary protocol, the non-proprietary protocol, or both. The configuration tool can use the parsed available data file to provide an interactive graphical user interface that allows the operator to select data in a set of data stores to be output by or otherwise retrieved from the FMS.

Based on the operator selections, the configuration tool can also generate a loadable first configuration file that instructs a data access component of the FMS of the selected data or data stores. The loadable first configuration can also include additional information for each identified data store, such as, for example, offsets, size, parameters, etc. The configuration tool can also generate the loadable first configuration file based in part on information in the definition database defining the proprietary protocol. In this non-limiting example, the configuration tool can generate the loadable first configuration file based on a variety of predetermined information such as, without limitation, the proprietary protocol, the non-proprietary protocol, a structure of data the data stores of the FMS, and any predetermined requirements associated with the EFB. In addition, the configuration tool can also generate a second configuration file that can be used by other selected legacy devices or applications on the data network to convert the data output by the data access component in accordance with the non-proprietary protocol.

The data access component can subscribe to data in the data stores (e.g., particular data topics) based on the loadable first configuration file. In particular, the data access component can output data from the subscribed data stores during runtime of the FMS. The data access component can output data as a stream output to other selected legacy avionics devices or applications connected to the data network and configured to receive the stream output data. The other selected legacy avionics devices or applications can receive the stream output data and convert the stream output data based at least in part on the second configuration file received from the configuration tool.

Additionally, the data access component can configure the accessed data in accordance with the non-proprietary protocol and output the data in accordance with the non-proprietary protocol to the EFB, based on the first configuration file. In this way, the new or upgraded EFB application can receive data from the FMS in accordance with the same legacy non-proprietary protocol used by the data network and previously certified as in compliance with operating regulations established by aviation authorities, to thereby avoid a need for re-certifying due to otherwise incompatible protocols.

Thus, aspects of the present disclosure provide a technique to customize or otherwise define data that is output by the avionics system during runtime. Furthermore, aspects of the present disclosure enable enhanced, flexible, and robust recording of flight test data, testing, debugging, and analyzing of in-service problems. Moreover, aspects of the present disclosure provide a method and system to provide data from the avionics system to a data receiving component in accordance with a predetermined protocol, without requiring a conversion or decoding of the data by the data receiving component in accordance with another predetermined protocol.

Although example aspects of the present disclosure are discussed with reference to avionics systems, the subject matter described herein can be used with or applied to provide flexible access to internal data of other systems, vehicles, machines, industrial or mechanical assets, or components without deviating from the scope of the present disclosure.

With reference now to the FIGS., example aspects of the present disclosure will be discussed in further detail.

FIG. 1, depicts a non-limiting aspect of an aircraft 8 having a fuselage 10 and at least one turbine engine, shown as a left engine system 12 and a right engine system 14. The left and right engine systems 12, 14 may be substantially identical. While the left and right engine systems 12, 14 are depicted by way of example as turbine engines, the aircraft 8 may include fewer or additional engine systems, or alternative propulsion engine systems, such as propeller-based engines. While FIG. 1 depicts the aircraft 8 as a fixed-wing type aircraft, it is contemplated that other non-limiting aspects of the aircraft 8 can include rotary wing type aircraft without departing from the scope of the disclosure herein.

The aircraft 8 is shown further comprising a plurality of sensors, systems, and components, collectively referred to as line-replaceable units (LRUs) 18, and at least one server 20 or computing unit, shown as two flight management systems, or flight control computers, located proximate to each other, near the nose of the aircraft 8. At least one of the servers 20 may further include memory 22.

The LRUs 18 and servers 20 may be communicatively interconnected by transmission or communication lines defining a data communications network 24, traversing at least a portion of the aircraft 8. Additional LRUs 18 may be included. While a server 20 is described, other non-limiting aspects may include any computing system, flight computer, or display system displaying data from multiple systems.

The memory 22 may include random access memory (RAM), flash memory, or one or more different types of portable electronic memory, etc., or any suitable combination of these types of memory. The LRUs 18 and/or servers 20 may be operably coupled with the memory 22 such that the LRUs 18 and/or servers 20, or any computer programs or processes thereon, may access at least a portion of the memory 22 (e.g. "shared memory" 22).

The aircraft 8 shown in FIG. 1 is merely a schematic representation to aid in understanding of one non-limiting aspect of the invention, and used to illustrate that a plurality of LRUs 18 and servers 20 may be located throughout the aircraft 8. The exact location of the LRUs 18 and servers 20 are not germane to the aspects as described herein. Additionally, more or fewer LRUs 18 or servers 20 may be included in other non-limiting aspects.

The data communications network 24 is illustrated as a bus, but may include a number of data communication connectors and interfaces, for example, Ethernet or fiber-optic cables, and routing and/or switching components, to facilitate the communicative interconnection between the LRUs and Servers 20. Furthermore, the configuration and operation of the data communications network 24 may be defined by a common set of standards or regulations applicable to particular aircraft environments. For example, the data communications network 24 on an aircraft 8 may be defined by, and/or configured according to, the ARINC 664 standard, or ARINC 653 standard.

Figure 2:
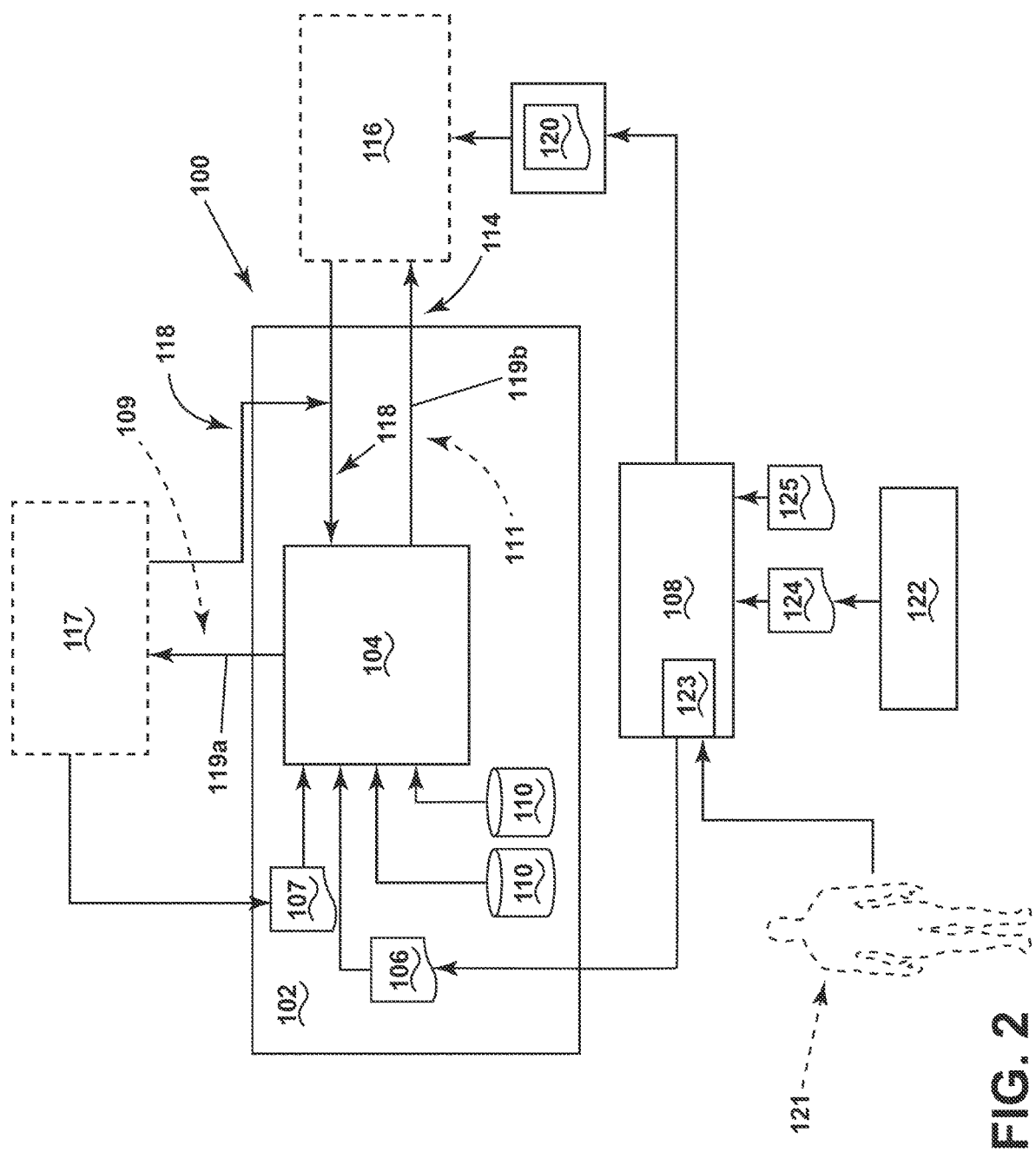
FIG. 2 depicts a block diagram of an example system to provide data from an avionics system, in accordance with various aspects described herein.

FIG. 2 depicts a block diagram of an example system 100 for flexible access of internal data of an avionics system 102 in accordance with a non-limiting aspect. The data can be saved in memory such as a set of data stores 110. In non-limiting aspects, the avionics system 102 can include, but is not limited to, a Flight Management System (FMS). In other non-limiting aspects, the avionics system 102 can be communicatively coupled to an FMS. In still other non-limiting aspects, the avionics system 102 can be a stand-alone system without need of an FMS, without departing from the scope of the disclosure herein.

The avionics system 102 can be communicatively coupled with a first receiving component 117 and a second receiving component 116. In non-limiting aspects, the first receiving component 117 and the second receiving component 116 can include, without limitation, one or more of an electronic flight bag (EFB), a flight data recorder (FDR), Automatic Dependent Surveillance-Broadcast system (ADS-B), Aircraft Interface Device (AID), a communications management unit (CMU), an in-flight entertainment system (IES), or an on-board maintenance system. Other aspects are not so limited however, and as used herein, the term "first data receiving component" and "second data receiving component" can refer to any avionics device that requires operative access to data from an avionics system (e.g., a FMS.) In non-limiting aspects, the first receiving component 117 or the second receiving component 116, or both, can be internal to or external to the avionics system 102. In one non-limiting aspect, the first receiving component 117, or the second receiving component 116, or both, can be a data communication/data downlink application. In another non-limiting aspect, the first receiving component 117, or the second receiving component 116, or both, can be a datalink application. In yet another non-limiting aspect, the first receiving component 117, or the second receiving component 116, or both, can include or form a portion of an FMS.

In some implementations, the avionics system 102 executes, operates, or otherwise runs on a framework that provides data and time management (e.g., scheduling). For example, the framework can manage data (e.g., Topics), and threads or timing called processing functions.

Figure 3:
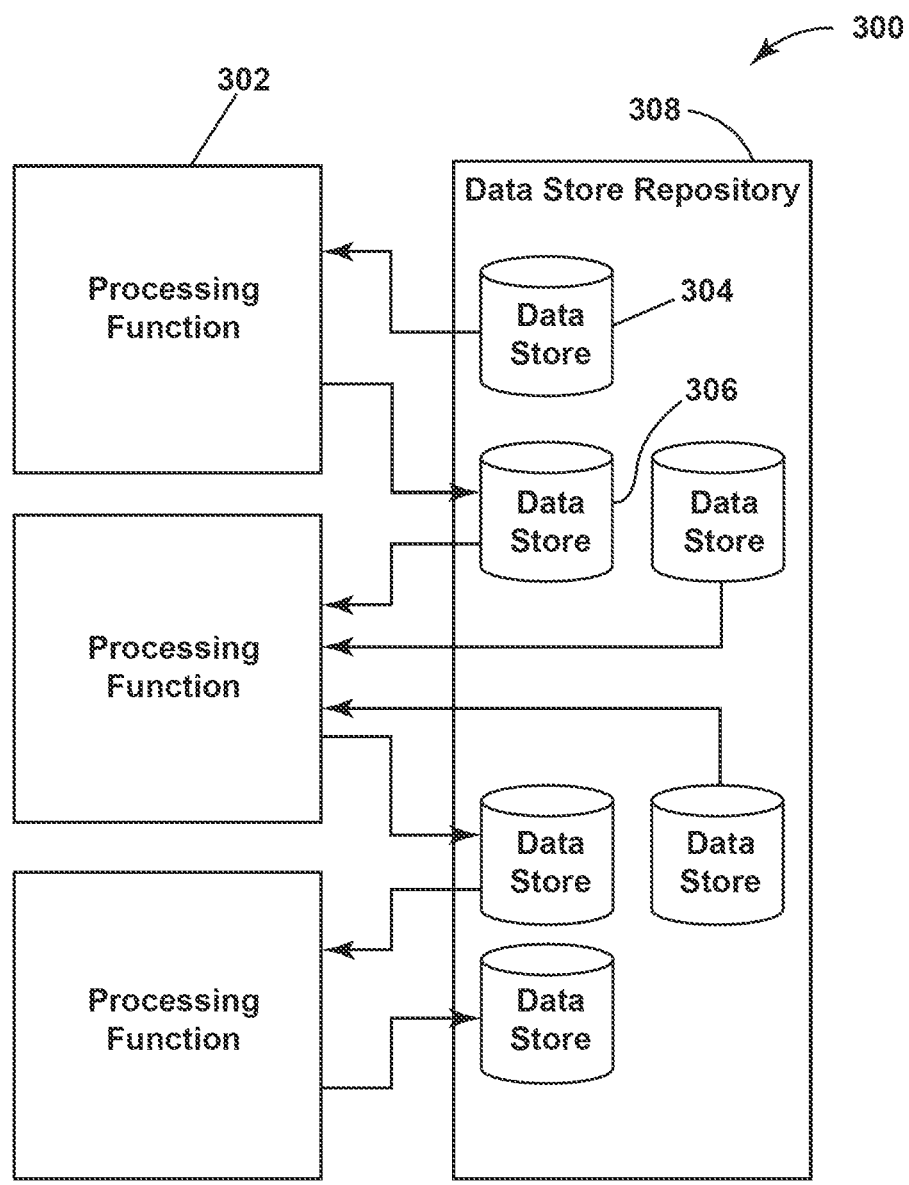
FIG. 3 depicts a block diagram of an example data access framework, in accordance with various aspects described herein.

The processing functions can communicate with each other via data stores. In some implementations, the framework enables access to data stores in a thread-safe way. In some non-limiting aspects, the framework can provide data management on a publish/subscription basis. To aid in understanding, one example visualization of the framework in a non-limiting aspect is depicted in FIG. 3. Use of the example framework by the avionics system 102 is provided as one example only and the present disclosure is not limited by or to this example context. Other techniques, systems, or platforms that enable data access and/or management by the avionics system 102 can be used in addition or alternatively to the framework.

Referring again to FIG. 2, the avionics system 102 can include a data access component 104. As described in more detail herein, the data saved in the data stores 110 can be provided by the data access component 104 to the first receiving component 117 as a first data output 119a, or the second receiving component 116 as a second data output 119b, or both. The data access component 104 executes, operates or otherwise runs based on a loadable first configuration file 106 (e.g., a Loadable Config File). For example, in one non-limiting aspect, the loadable first configuration file 106 can include instructions for the data access component 104 to output the first data output 119a, or the second data output 119b, or both, every 2 seconds.

The data access component 104 can include a definition database 107. For example, the definition database 107 can be provided to the data access component 104 via an automatic upload or file transfer from the first receiving component 117. In other non-limiting aspects, the definition database 107 can be entered or otherwise provided to the data access component 104 manually by a user 121. In other non-limiting aspects, the definition database 107 can be provided to the data access component 104 using any desired technique, method, or system without departing from the scope of the disclosure herein. The definition database 107 can comprise or define a predetermined proprietary first protocol 109 associated with the first receiving component 117. The proprietary first protocol 109 can specify predetermined information for data storage or transmission, (e.g. data offsets, sizes, types, parameters, etc.). In some non-limiting aspects, the data can be output as non-human readable data.

The system 100 can also include a configuration tool 108. In non-limiting aspects, the configuration tool 108 can enable a user 121 to select data to be output from the data access component 104, and the frequency of said output. For example, the configuration tool 108 can include a program or graphic user interface 123 through which the user 121 picks data (e.g., Topics or certain parameters for certain Topics) from a predetermined set of data, and a frequency of output for the selected data from the data stores 110. In other non-limiting aspects, the configuration tool 108 can be communicatively coupled to an EFB or other avionics device 125 to additionally or alternatively receive a selection of the data output from the one or more data stores 110 from the EFB or other avionics device 125.

In some aspects, the configuration tool 108 can have prior knowledge of how data is maintained in the data stores 110, the platform environment, the processor, etc. For example, based at least in part on user 121 input, via the user interface 123, the configuration tool 108 can generate the loadable first configuration file 106 (as shown in FIG. 2) that instructs the data access component 104 to access data stores, and output data based on selections made by the user 121 or the definitions database 107, or both. For example, in some non-limiting aspects, the loadable first configuration file 106 can include instructions to configure or convert data stored in accordance with the proprietary first protocol 109 to a standard or non-proprietary second protocol 111 prior to providing the data as the first data output 119a. In non-limiting aspects, the loadable first configuration file 106 can be provided to the data access component 104 via an EFB or other another avionics device 125. In other non-limiting aspects, the loadable first configuration file 106 can be loaded directly by the user 121, for example, via the user interface 123. In non-limiting aspects, the configuration tool 108 can also generate a second configuration file 120 that can be used by the second receiving component 116 to convert the second data output 119b received from the data access component 104. In some non-limiting aspects, the configuration tool 108 can generate the first configuration file 106, or second configuration file 120, or both based on information received from an EFB or other avionics device 125.

In some aspects, the data access component 104 can parse the loadable first configuration file 106 at startup and subscribe to a set of data or data stores based on a list or instructions contained in the loadable first configuration file 106. In some non-limiting aspects, the data access component 104 can subscribe to the data or data stores through the use of string literals and generic data types, so that the data specification is not needed at run time, thereby making the interface more flexible.

In non-limiting aspects, in addition to specifying data or data stores, the loadable first configuration file 106 (Loadable Config File) can also specify particular data entries (e.g., parameters) within a data store. The loadable first configuration file 106 can provide instructions (e.g., offsets, type, size, etc.) regarding how many bytes are to be read. For example, an offset can describe a number of bytes from the beginning of the data store where a particular data item starts; a size can describe a number of bytes that a particular data item occupies; and a type can define how to interpret those bytes.

The requested data specified by the loadable first configuration file 106 can be grouped so a sub-group of data can be requested. Each group can output data at a defined rate and the data access component 104 can manage run rates. This allows for limiting the amount of data output simultaneously by splitting it across multiple groups. The consumer or recipient of the data can then send requests to the data access component 104 to toggle the output as needed. As one example, at each cycle the data access component 104 can read data of the data store through a framework-provided pointer and can extract individual data items based on the offsets and sizes (or types) defined in the loadable first configuration file 106.

The loadable first configuration file 106 can include instructions for translating or converting the specified data, when stored in the data store 110 in accordance with the proprietary first protocol 109, to the non-proprietary second protocol 111. The converted data can be delivered as the first data output 119a to the first receiving component 117 in accordance with the non-proprietary second protocol 111. For example, in non-limiting aspects, the non-proprietary second protocol 111 can specify the output data be serialized into a byte stream and output as a standard stream output such as an ARINC 429 or ARINC 664.

Furthermore, the loadable first configuration file 106 can include instructions for outputting the extracted data as a second data output 119b in accordance with the non-proprietary second protocol 111 associated with the second receiving component 116. In some non-limiting aspects, the data can be output as non-human readable data. In some non-limiting aspects, the data second output 119b in accordance with the non-proprietary second protocol 111 can be in a standard or non-proprietary format. For example, in non-limiting aspects, the non-proprietary second protocol 111 can specify the output data be serialized into a byte stream and output as a standard stream output 114. For instance, the stream output 114 can include either ARINC 429 or ARINC 664, for example, where it is preferable to limit the data output 119b to the maximum payload. Additionally, or alternatively, pagination can be employed, for example, where multiple transmissions get indices as well as the maximum number of transmissions to expect for the receiver. The option of grouping can also be provided where not all data is needed contiguously.

Furthermore, the data access component 104 can also provide protection mechanisms to avoid "draining" the system by requesting too much data. For example, Cyclic Redundancy Checks (CRCs), public and private keys, or other encryption or security technology can be used, as described further below. These protection mechanisms can be in addition to mechanisms in the configuration tool 108. The data access component 104 can also check the input file and make sure it meets a set of predetermined criteria (e.g., doesn't make invalid requests). For example, the data access component 104 can ensure that the number of bytes requested per output group does not exceed a threshold value.

In non-limiting aspects, the first receiving component 117, or the second receiving component 116, or both, can request or trigger actions from the data access component 104. For example, the first receiving component 117, or the second receiving component 116, or both, can trigger a respective first or second data output 119a, 119b from the data access component 104 via a request queue 118 that is serviced by the data access component 104. In some implementations, the request queue 118 can be used to send particular requests to enable and/or disable the respective first or second data output 119a, 119b, or both based on the different groups or sub-groups defined in the loadable first configuration file 106. Additionally, or alternatively, the data access component 104 can provide the first data output 119a to the first receiving component 117 in accordance with the non-proprietary second protocol 111 with the proprietary first protocol 109 as specified by the definition database 107, and further provide the second data output 119b to the second receiving component 116 in accordance with the non-proprietary second protocol 111 (e.g., the stream output 114). It will be appreciated that while FIG. 2 depicts the single first receiving component 117 associated with the proprietary first protocol 109 defined in the definition database 107, other aspects are not so limited and can include any desired number of first receiving components 117 associated with any number of distinct proprietary first protocols 109 defined in any number of definition databases 107 without departing from the scope of the disclosure herein.

The first receiving component 117, or the second receiving component 116, or both, can trigger the respective first or second data output 119a, 119b from, or contract, the data access component 104 in a plurality of ways, including but not limited to periodically (e.g., output data at a specified rate), on demand (e.g., a one-time request), or based on an event. For example, the first receiving component 117, or the second receiving component 116, or both, can trigger an output of data when an aircraft reaches a cruising altitude. Events used as triggers can be predefined, and the data to be output can be configurable. For example, in other non-limiting aspects, the triggering event can be a determination that an aircraft in-flight has reached a way point. In other non-limiting aspects, the output of data can be manually triggered by a user such as flight crew or maintenance personnel. In non-limiting aspects, the data can be indicative of any desired number of parameters relative to the aircraft, including detected, measured, sensed, calculated, derived, or otherwise determined data. For example, in non-limiting aspects, the first or second receiving component 116, 117 can be a flight recorder such as an FDR which can receive and record data relevant to the recent history of a flight including of dozens of parameters collected from the data access component 104 several times per second. For example, during normal flight operations, the FDR can capture specific aircraft performance parameters such as airspeed, altitude, vertical acceleration, time, nose heading, steering wheel position, rudder pedal position, steering wheel position, horizontal stabilizer, and fuel flow.

In non-limiting aspects, the second receiving component 116 can convert the received data before or after recording. For example, the second receiving component 116 can convert the received data while in-flight or during post-processing. In addition, the second receiving component 116 can ensure that it has an up-to-date second configuration file 120 to convert the data stream based on version information included in or associated with the second configuration file 120.

In particular, in non-limiting aspects the configuration tool 108 can further provide the second configuration file 120 to the second receiving component 116 to enable the second receiving component 116 to convert data obtained, acquired, or otherwise received from the data access component 104. For example, data received from the data access component 104 can be a set of serialized data (e.g., serialized bytes). The second receiving component 116 can convert the serialized data based on information contained in the second configuration file 120.

In some implementations, the configuration tool 108 can generate the second configuration file 120 based at least in part on prior knowledge of the platform environment, the data stores 110, the processor, avionics system software version, the proprietary first protocol 109, the non-proprietary second protocol 111, etc., and can enable the configuration tool 108 to instruct the second receiving component 116 how to convert received data from the data access component 104.

The first receiving component 117, or the second receiving component 116, or both, can enable robust and flexible access to aircraft data during testing, such as testing of the FMS. For example, partition-level testing (e.g., equivalence partitioning or boundary value analysis may require access to data or data stores. Previously, for example, a hard-coded bus (e.g., Air-Ground Equipment Bus) would be required to access the desired information/data. However, in view of the disclosures herein, the first receiving component 117, or the second receiving component 116, or both, can trigger a respective first or second data output 119a, 119b from the data access component 104 and receive the data in accordance with their predetermined respective protocols. The data received from the data access component 104 by the first receiving component 117, or the second receiving component 116, or both, can be aggregated and compared with calculated or expected values to validate the performance of the FMS.

In contrast to conventional systems, the configuration tool 108 thus has no need to provide a second configuration file 120 to the first receiving component 117 to enable the first receiving component 117 to convert data obtained, acquired, or otherwise received from the data access component 104.

In some non-limiting aspects, the configuration tool 108 can generate the second configuration file 120 based at least in part on, without limitation, prior knowledge of the platform environment, the data stores 110, the processor, avionics system software version, the non-proprietary second protocol 111, the definition database 107, the proprietary first protocol 109, and combinations thereof.

The configuration tool 108 can provide an easy-to-use interface (e.g., user interface 123) that enables a user 121 to set, choose, or otherwise select criteria (e.g., data, timing, etc.) for a particular second configuration file 120. The configuration tool 108 generates the second configuration file 120 based on awareness of the structure of the data in the data stores 110 (e.g., Topics) and the protocol requirements for the second receiving component 116. The configuration tool 108 can generate both the loadable first configuration file 106 (Loadable Config File) for the data access component 104 and the second configuration file 120 (Config File) for the second receiving component 116.

In some non-limiting aspects, the configuration tool 108, or other system component, can parse a set of application source code 122 to provide a list of all available data stores 110. In some aspects, the application source code 122 can be the source code of the avionics system 102. In particular, the application source code 122 can describe or otherwise contain the structure of the data stores 110 or other information about the structure and/or operation of the avionics system 102 and/or the framework. Parsing the application source code 122 can result in a parsed available data file 124 which contains a list of all available data stores 110 and/or other information (e.g., topic parameters, sizes, offsets, etc.).

In some implementations, in addition to the application source code 122, the configuration tool 108 can analyze or otherwise use one or more binary object files of the avionics system 102 to determine the memory layout of the avionics system 102. For example, a compiler can optionally create a context clause (which also may be known as a representation specification). This context clause can contain tables describing the memory layout. The configuration tool 108 can use the context clause as an input in addition to the source code 122 (which can still be used to determine dependencies of nested data structures).

Based on the target processor architecture (e.g., the processor which implements the data access component 104), the configuration tool 108 can also be aware of bit and byte alignment and endianness to adjust offsets in the loadable first configuration file 106. The endianness information can also be used by the second receiving component 116 to convert the data stream. The configuration tool 108 can also account for units of each data item either through meta data in the application source code 122 or through the type definition name (e.g., Feet Type). Additionally, or alternatively, the configuration tool 108 can enable the user 121 to update, change, or otherwise add the meta data. For example, where the configuration tool 108 cannot infer the meta data, the user 121 can add meta data that will be maintained for future use.

Thus, the parsed available data file 124 can be a representation of the application source code 122 that the configuration tool 108 can use to generate both the loadable first configuration file 106 and the second configuration file 120 for the first receiving component 117, the second receiving component 116, or both. This intermediate parsed available data file 124 can be used to provide the configuration tool 108 to a third party (e.g., a customer) and allow them to create their own loadable first configuration files 106 while limiting scope and visibility to the application source code 122.

In non-limiting aspects, data integrity can be ensured. For example, trial and error tests to extract undesired data, or attempts to crash the software can be prevented by applying a CRC to the loadable first configuration files 106 or second configuration files 120 (e.g., with only the data access component 104 knowing how to calculate the CRC) or using any other form of a hash or electronic signature.

In some implementations, the loadable first configuration file 106 and the second configuration file 120 can have maximum size limits. Likewise, the contents of the file can have a group number limit. This can influence the memory and request interface sizes internal to the data access component 104.

Each of the configuration tool 108, the data access component 104, the first receiving component 117, and the second receiving component 116 can be implemented by one or more computing devices which can include one or more processors and a memory. The one or more processors can be can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store instructions which are executed by the processor to perform operations.

In one particular non-limiting example, the configuration tool 108 can be implemented by a computing device that is located in a ground station; the avionics system 102 (including the data access component 104) can implemented by another computing device that is on-board an aircraft; and the receiving component can be implemented by yet another computing device located on-board the aircraft. However, the previous distribution is provided as one example only. Many other and different distributions of computing functionality can be used.

In some implementations, each of the configuration tool 108, the data access component 104, the first receiving component 117, the second receiving component 116, or combinations thereof can correspond to or otherwise include computer logic utilized to provide desired functionality. Thus, each of the configuration tool 108, the data access component 104, the first receiving component 117, or the second receiving component 116 can be implemented in hardware, application specific circuits, firmware and/or software controlling a general-purpose processor, or combinations thereof. In one non-limiting aspect, each of the configuration tool 108, the data access component 104, the first receiving component 117, and the second receiving component 116 can correspond to program code files stored on a storage device, loaded into memory and executed by a processor or can be provided from computer program products, for example computer executable instructions, that are stored in a tangible computer-readable storage medium such as RAM, hard disk or optical or magnetic media. In some implementations, each of the data stores 110 can include some form of non-transitory computer-readable storage media, including, for example, volatile and/or non-volatile memory, databases, etc.

Turning now to FIG. 3, illustrated is an example framework 300 for communication of data in an avionics system in accordance with various aspects described herein. As discussed, the framework 300 provides data and time management. For example, the framework 300 can manage data (e.g., topics) and can manage threads or timing called processing functions or components. For instance, the framework 300 can manage a first processing function that runs every 200 milliseconds and performs a first task, and at the same time a second processing function that runs every 1 second and performs a second task. The framework 300 can include a set of data stores or topics and a set of mail slots. The framework 300 enables accessing data from the data stores and mail slots.

A set of processing functions (e.g., processing function 302) are in communication with, linked to, or otherwise connected to the framework 300. The processing functions can execute, operate or otherwise run at flexible or rigid times. The processing functions 302 can access data from a set of data stores (e.g., data stores 304 and 306) included in a data store repository 308 maintained by the framework 300. For example, the processing function 302 is illustrated as accessing or otherwise interacting with the data stores 304 and 306 of the data store Repository 308.

The framework 300 enables access of data items (e.g., topics) by name (e.g., via string literals). By knowing the name that will be used in the configuration file, the configuration tool can specify the name of the data in which the user is interested. The data access component can parse the configuration file to subscribe to the appropriate data stores.

In non-limiting aspects, whenever the system is restarted, the data access component can load the configuration file and subscribe/re-subscribe to the desired data or data store. Additionally, or alternatively, data groups can be specified to toggle the data being output at runtime and the data access component 104 can parse and subscribe to all potential groups.

FIG. 4 illustrates a non-limiting example of a method 400 of to provide data from an avionics system 102 (e.g., an FMS), for example, using the system 100 of FIG. 2. The method 400 can be performed while the aircraft 8 is in-flight or on-ground. Although the avionics system 102 is described herein in terms of an FMS 102, it will be appreciated that the method 400 can be applied to any suitable avionics device or system. While the method 400 will be described with reference to the avionics system 102 of FIG. 3, other aspects are not so limited and the method 400 can be implemented on any other avionics 102 without departing from the scope of the disclosure herein.

In non-limiting aspects, the method 400 can begin, at 410, by receiving, by the configuration tool 108, a selection of the data store 110 of the avionics system 102, and a selection of at least one of the first receiving component 117 and the second receiving component 116. In non-limiting aspects, the first receiving component can be associated with a proprietary first protocol 109, and a second receiving component 116 associated with a non-proprietary second protocol 111.

The configuration tool 108 can be implemented by one or more processors. The one or more processors can be can be any suitable processing device (e.g., a processor core, a microprocessor, an ASIC, a FPGA, a controller, a microcontroller, etc.) and can be one processor or a plurality of processors that are operatively connected. The one or more processors can include or be operatively coupled to a memory. The memory can include one or more non-transitory computer-readable storage mediums, such as RAM, ROM, EEPROM, EPROM, flash memory devices, magnetic disks, etc., and combinations thereof. For example, in non-limiting aspects, the configuration tool 108 can receive the selection of the one or more data stores 110 via the user interface 123. The user interface 123 can enable the user 121 to select the one or more data stores 110 from the set of available data stores 110, and to select the at least one of the first receiving component 117 and the second receiving component 116 to receive the selected data. It will be appreciated that in other non-limiting aspects, the configuration tool 108 can receive the selection of the one or more data stores 110 via an Electronic Flight Bag (EFB) or other avionics device 125.

The method 400 can further include, at 420, generating, by the configuration tool 108, a first configuration file 106 including instructions for at least one of a first data output 119a from the selected data store 110 to the first receiving component 117, and a second data output 119b from the selected data store 110 to the second receiving component 117. The first configuration file 106 can be based at least in part on the received selection of the one or more data stores 110, and the selected receiving component 116, 117. In some aspects, the configuration tool 108 can generate the loadable first configuration file 106 that provides instructions to the data access component 104 to access data stores 110, retrieve data therefrom, and to output the retrieved data based on selections made by the user 121. In other non-limiting aspects, the loadable first configuration file 106 can be loaded directly by the user 121, for example, via the user interface 123.

In response to a received selection of the second receiving component, the method 400 can include, at 430, generating, by the configuration tool 108, a second configuration file 120. The second configuration file 120 can include instructions usable by the second receiving component 116 to convert the second data output 119b. For example, the data second output 119b in accordance with the non-proprietary second protocol 111 can be in a standard or non-proprietary format such as a serialized a byte stream and output as a standard stream output 114. For instance, the stream output 114 be in accordance with ARINC 429 or ARINC 664 standards. In non-limiting aspects, the non-proprietary second protocol 111 can include portions of any one or more of the data stores 110, hard coded values, or other data or data abstraction as desired. In non-limiting aspects, the configuration tool 108 can further specify, based at least in part on the received selection of the one or more data stores 110, one or more of an offset and a size associated with each data store 110. In further response to a received selection of the second receiving component, the method 400 can also include, at 440, providing, by the configuration tool 108, the second configuration file 120 to the second receiving component 117.

At 450, the method 400 can include receiving, by the data access component 104, the first configuration file 106. For example, the first configuration file 106 can be provided to the data access component 104 via an EFB or another avionics device 125. In other non-limiting aspects, the first configuration file 106 can be provided to the data access component 104 by the configuration tool 108.

The method 400 can also include, at 460, accessing, by the data access component 104, one or more data stores 110 that contain the internal data of the avionics system 102, based on the first configuration file 106.

In response to instructions for the first data output 119 to the first receiving component 117, the method 400 can also include, at 470, accessing, by the data access component 104, a definition database 107 that defines the proprietary first protocol 109. In non-limiting aspects, the first configuration file 106 can include instructions for at least one of a first data output 119a from the selected data store 110 to the first receiving component 117. For example, in non-limiting aspects, the proprietary first protocol 109 can be specialized or proprietary protocol associated with the first receiving component 117. In some aspects, the proprietary first protocol 109 can be defined by the manufacturer of the first receiving component 117. In non-limiting aspects, the definition database 107 can be provided to the data access component 104 via an automatic upload or file transfer from the first receiving component 117. In other non-limiting aspects, the definition database 107 can be entered or otherwise provided to the data access component 104 manually by a user 121. In some non-limiting aspects, the first configuration file 106 can further include the definition database 107. In still other non-limiting aspects, the definition database 107 can be provided to the data access component 104 using any desired technique, method, or system without departing from the scope of the disclosure herein. The definition database 107 can comprise or define the proprietary first protocol 109. The proprietary first protocol 109 can be a proprietary protocol associated with the first receiving component 117.

The method 400 can further include at 475, retrieving, by the data access component 104, data from the selected data store 110 stored in accordance with the proprietary first protocol 109, based on the first configuration file 106. In the event of a selection of the first receiving component 117, the method can include at 477, configuring or converting the retrieved data from the selected data store 110, in accordance with the non-proprietary second protocol 111, based on the first configuration file 106. In non-limiting aspects, the retrieved data from the selected data store 110 can be converted from the proprietary first protocol 109 to the non-proprietary second protocol 111. For example, in non-limiting aspects, the retrieved data from the selected data store 110 can be converted by the data access component 104.

The method 400 can include at 480, providing, by the data access component 104, the retrieved data from the selected data store 110 to at least one of the first receiving component 117 as the first data output 119a, and the second receiving component 116 as a second data output 119b, based on the non-proprietary second protocol 111.

The method 400 can also include, at 490 converting or decoding, by the second receiving component 116, the second data output 119b by the data access component 104 based on the second configuration file 120. For example, data received from the data access component 104 can be a set of serialized data (e.g., serialized bytes), and the second receiving component 116 can convert the serialized data based on information contained in the second configuration file 120.

In non-limiting aspects, the method 400 can include, at 495, operating the at least one of the first receiving component 117 based on the first data output 119a, and the second receiving component 116 based on the second data output 119b.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method.

To the extent not already described, the different features and structures of the various aspects can be used in combination with each other as desired. That one feature is not illustrated in all the aspects is not meant to be construed that it is not included, but is done for brevity of description. Thus, the various features of the different aspects can be mixed and matched as desired to form new aspects of the disclosure, whether the new aspects are expressly described. All combinations or permutations of features described herein are covered by this disclosure.

This written description uses examples to disclose aspects of the disclosure, including the best mode, and to enable any person skilled in the art to practice the aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be appreciated that aspects disclosed herein enable flexible access and configuration of internal data of an avionics system (e.g., an FMS) to provide the data from the avionics system to a first data receiving component in accordance with a first proprietary protocol associated with the first data receiving component. The data can be converted to a non-proprietary second protocol by the FMS prior to providing to the first data receiving component, without requiring a recertification when adding, changing or modifying the first data receiving component. Aspects as disclosed herein further enable flexible access and configuration of internal data of an avionics system to provide the data from the avionics system to a second data receiving component in accordance with the second standard or non-proprietary protocol. In this way, an avionics device that would otherwise be incompatible with the non-proprietary communication protocols of a legacy aviation system can be implemented as part of the aviation system without re-certifying the system. For example, as disclosed in more detail hereinabove, non-limiting aspects can enable a first avionics device configured to operate based on data received in accordance with a proprietary protocol associated with the first avionics device to be communicatively coupled (e.g. retrofit) to a legacy communication system in an aircraft adapted to communicate in accordance with a non-proprietary protocol. Additionally, the aviation system and method disclosed herein can provide data to the second avionics device in accordance with the non-proprietary second protocol along with a second configuration file including instructions to enable the second avionics device to translate or otherwise convert the data to a format usable by the second avionics device. For example, aspects as described herein can additionally or alternatively enable translation or conversion of data to an industry standard (i.e., non-proprietary) format, for use in another aviation device that is compatible with the legacy system.

Various characteristics, aspects and advantages of the present disclosure can also be embodied in any permutation of aspects of the disclosure, including but not limited to the following technical solutions as defined in the enumerated aspects:

An avionics system, comprising: a configuration tool, arranged to: receive a selection of a data store of the avionics system, and a selection of at least one of a first receiving component associated with a proprietary first protocol, and a second receiving component associated with a non-proprietary second protocol; generate a first configuration file providable to the selected at least one of the first receiving component and second receiving component, the first configuration file including instructions for at least one of a first data output from the selected data store to the first receiving component, and a second data output from the selected data store to the second receiving component; generate, based on a received selection of the second receiving component, a second configuration file providable to the second receiving component, including instructions usable by the second receiving component to convert the second data output by the second receiving component; a data access component, arranged to, access data in the data store based on the first configuration file, and based on a selection of the first receiving component, access a definition database defining the proprietary first protocol and to configure the accessed data in accordance with the non-proprietary second protocol based on the definition database, the data access component further configured to output the data in accordance with the non-proprietary second protocol to the at least one of the first receiving component and second receiving component, based on the first configuration file; wherein the first receiving component is configured to receive data output from the data access component in accordance with the non-proprietary second protocol; and wherein the second receiving component is configured to receive data output from the data access component in accordance with the non-proprietary second protocol, and to convert the data received from the data access component based on the second configuration file.

The avionics system of any preceding clause, further comprising a user interface, wherein the configuration tool is configured to receive the selection of the data store via the user interface.

The avionics system of any preceding clause, wherein the user interface enables a user to select the data store from a set of available data stores, and to select the at least one of the first receiving component and the second receiving component to receive the selected data store.

The avionics system of any preceding clause, wherein the configuration tool is configured to generate the first configuration file based at least in part on the selection of the data store.

The avionics system of any preceding clause, wherein the second configuration file defines the non-proprietary second protocol.

The avionics system of any preceding clause, wherein the first configuration file includes the definition database.

The avionics system of any preceding clause, wherein the definition database is provided to the avionics system by one of the first receiving component and an EFB.

The avionics system of any preceding clause, wherein the first receiving component is configured to operate based on the data received from the data access component.

The avionics system of any preceding clause, wherein the data access component is configured to provide the second configuration file to the second receiving component.

The avionics system of any preceding clause, wherein the second receiving component is configured to operate based on the received data.

A method to configure data in an avionics system, the method comprising:
  receiving, by a configuration tool, a selection of a data store of the avionics system, and a selection of at least one of a first receiving component associated with a proprietary first protocol, and a second receiving component associated with a non-proprietary second protocol; generating, by the configuration tool, a first configuration file including instructions for at least one of a first data output from the selected data store to the first receiving component, and a second data output from the selected data store to the second receiving component; in response to a received selection of the second receiving component: generating, by the configuration tool, a second configuration file that includes instructions usable by the second receiving component to convert the second data output; providing, by the configuration tool, the second configuration file to the second receiving component; receiving, by a data access component of the avionics system, the first configuration file; accessing, by the data access component, the selected data store based on the first configuration file; retrieving by the data access component, data from the selected data store based on the first configuration file; in response to instructions for the first data output to the first receiving component: accessing, by the data access component, a definition database that defines the proprietary first protocol; configuring the data retrieved by the data access component in accordance with the non-proprietary second protocol;
  providing, by the data access component, the retrieved data to at least one of the first receiving component and the second receiving component, based on the non-proprietary second protocol; and operating the at least one of the first receiving component and the second receiving component based on the data provided.

The method of any preceding clause, wherein the configuration tool receives the selection of the data store via one of a user interface and an avionics device.

The method of any preceding clause, wherein the user interface enables a user to select the data store from a set of data stores, and to select the at least one of the first receiving component and the second receiving component.

The method of any preceding clause, wherein the first configuration file further includes the definition database.

The method of any preceding clause, wherein the first configuration file is provided to the data access component via one of an EFB and the first receiving component.

The method of any preceding clause, further comprising converting, by the second receiving component, the data output by the data access component based on the second configuration file.

A non-transitory computer readable medium comprising instructions that, when executed, cause a processor to at least: receive a selection of a data store of an avionics system, and a selection of at least one of a first receiving component associated with a proprietary first protocol, and a second receiving component associated with a non-proprietary second protocol; generate a first configuration file including instructions for at least one of a first data output from the selected data store to the first receiving component, and a second data output from the selected data store to the second receiving component; in response to a received selection of the second receiving component: generate a second configuration file that includes instructions usable by the second receiving component to convert the second data output; provide the second configuration file to the second receiving component; access the selected data store based on the first configuration file; access, in response to instructions for the first data output to the first receiving component, a definition database that defines the proprietary first protocol; retrieve data from the selected data store based on the first configuration file; convert the retrieved data from the proprietary first protocol to the non-proprietary second protocol; and provide the retrieved data to at least one of the first receiving component and the second receiving component in accordance with the non-proprietary second protocol.

The non-transitory computer readable medium of any preceding clause, wherein the selection of a data store is received via one of a user interface and an avionics device.

The non-transitory computer readable medium of any preceding clause, wherein the user interface enables a user to select the data store from a set of available data stores, and to select the at least one of the first receiving component and the second receiving component.

The non-transitory computer readable medium of any preceding clause, wherein the definition database is provided to the non-transitory computer readable medium by one of the first receiving component and an EFB.

What is claimed is:

1. An avionics system, comprising:
    a configuration tool, arranged to:
      receive a selection of a data store of the avionics system, and a selection of at least one of a first receiving component associated with a proprietary first protocol, and a second receiving component associated with a non-proprietary second protocol;
      generate a first configuration file providable to the selected at least one of the first receiving component and second receiving component, the first configuration file including instructions for at least one of a first data output from the selected data store to the first receiving component, and a second data output from the selected data store to the second receiving component;
      generate, based on a received selection of the second receiving component, a second configuration file providable to the second receiving component, including instructions usable by the second receiving component to convert the second data output by the second receiving component;
    a data access component, arranged to, access data in the data store based on the first configuration file, and based on a selection of the first receiving component, access a definition database defining the proprietary first protocol and to configure the accessed data in accordance with the non-proprietary second protocol based on the definition database, the data access component further configured to output the data in accordance with the non-proprietary second protocol to the at least one of the first receiving component and second receiving component, based on the first configuration file;

wherein the first receiving component is configured to receive data output from the data access component in accordance with the non-proprietary second protocol; and wherein the second receiving component is configured to receive data output from the data access component in accordance with the nonproprietary second protocol, and to convert the data received from the data access component based on the second configuration file.

2. The avionics system of claim 1, further comprising a user interface, wherein the configuration tool is configured to receive the selection of the data store via the user interface.

3. The avionics system of claim 2, wherein the user interface enables a user to select the data store from a set of available data stores, and to select the at least one of the first receiving component and the second receiving component to receive the selected data store.

4. The avionics system of claim 1, wherein the configuration tool is configured to generate the first configuration file based at least in part on the selection of the data store.

5. The avionics system of claim 1, wherein the second configuration file defines the non-proprietary second protocol.

6. The avionics system of claim 1, wherein the first configuration file includes the definition database.

7. The avionics system of claim 1, wherein the definition database is provided to the avionics system by one of the first receiving component and an EFB.

8. The avionics system of claim 1, wherein the first receiving component is configured to operate based on the data received from the data access component.

9. The avionics system of claim 1, wherein the data access component is configured to provide the second configuration file to the second receiving component.

10. The avionics system of claim 9, wherein the second receiving component is configured to operate based on the received data.

11. A method to configure data in an avionics system, the method comprising:
receiving, by a configuration tool, a selection of a data store of the avionics system, and a selection of at least one of a first receiving component associated with a proprietary first protocol, and a second receiving component associated with a non-proprietary second protocol;
generating, by the configuration tool, a first configuration file including instructions for at least one of a first data output from the selected data store to the first receiving component, and a second data output from the selected data store to the second receiving component;
in response to a received selection of the second receiving component:
generating, by the configuration tool, a second configuration file that includes instructions usable by the second receiving component to convert the second data output;
providing, by the configuration tool, the second configuration file to the second receiving component;
receiving, by a data access component of the avionics system, the first configuration file;
accessing, by the data access component, the selected data store based on the first configuration file;
retrieving by the data access component, data from the selected data store based on the first configuration file;
in response to instructions for the first data output to the first receiving component:
accessing, by the data access component, a definition database that defines the proprietary first protocol;
configuring the data retrieved by the data access component in accordance with the non-proprietary second protocol;
providing, by the data access component, the retrieved data to at least one of the first receiving component and the second receiving component, based on the non-proprietary second protocol; and
operating the at least one of the first receiving component and the second receiving component based on the data provided.

12. The method of claim 11, wherein the configuration tool receives the selection of the data store via one of a user interface and an avionics device.

13. The method of claim 12, wherein the user interface enables a user to select the data store from a set of data stores, and to select the at least one of the first receiving component and the second receiving component.

14. The method of claim 11, wherein the first configuration file further includes the definition database.

15. The method of claim 12, wherein the first configuration file is provided to the data access component via one of an EFB and the first receiving component.

16. The method of claim 11, further comprising converting, by the second receiving component, the data output by the data access component based on the second configuration file.

17. A non-transitory computer readable medium comprising instructions that, when executed, cause a processor to at least:
receive a selection of a data store of an avionics system, and a selection of at least one of a first receiving component associated with a proprietary first protocol, and a second receiving component associated with a non-proprietary second protocol;
generate a first configuration file including instructions for at least one of a first data output from the selected data store to the first receiving component, and a second data output from the selected data store to the second receiving component;
in response to a received selection of the second receiving component:
generate a second configuration file that includes instructions usable by the second receiving component to convert the second data output;
provide the second configuration file to the second receiving component;
access the selected data store based on the first configuration file;
access, in response to instructions for the first data output to the first receiving component, a definition database that defines the proprietary first protocol;
retrieve data from the selected data store based on the first configuration file;
convert the retrieved data from the proprietary first protocol to the non-proprietary second protocol; and provide the retrieved data to at least one of the first receiving component and the second receiving component in accordance with the non-proprietary second protocol.

18. The non-transitory computer readable medium of claim 17, wherein the selection of a data store is received via one of a user interface and an avionics device.

19. The non-transitory computer readable medium of claim 18, wherein the user interface enables a user to select the data store from a set of available data stores, and to select the at least one of the first receiving component and the second receiving component.

20. The non-transitory computer readable medium of claim 17, wherein the definition database is provided to the non-transitory computer readable medium by one of the first receiving component and an EFB.

* * * * *